US00RE49567E

(19) United States
(12) Reissued Patent
Russo

(10) Patent Number: US RE49,567 E
(45) Date of Reissued Patent: Jul. 4, 2023

(54) TILE LIPPAGE POST

(71) Applicant: RUSSO TRADING COMPANY, INC., Menomonee Falls, WI (US)

(72) Inventor: William P. Russo, Hartford, WI (US)

(73) Assignee: RUSSO TRADING COMPANY, INC., Menomonee Falls, WI (US)

(21) Appl. No.: 29/803,226

(22) Filed: Aug. 11, 2021

Related U.S. Patent Documents

Reissue of:
(64) Patent No.: Des. 856,111
Issued: Aug. 13, 2019
Appl. No.: 29/615,817
Filed: Aug. 31, 2017

U.S. Applications:
(63) Continuation-in-part of application No. 15/161,398, filed on May 23, 2016, now abandoned, which is a
(Continued)

(51) LOC (14) Cl. ..... 08-08
(52) U.S. Cl.
USPC ..... D8/105; D8/47; D8/14
(58) Field of Classification Search
USPC ..... D8/14, 47, 71, 105
(Continued)

(56) References Cited

U.S. PATENT DOCUMENTS 1,474,779 A 11/1923 Kammer
1,635,313 A 7/1927 Dieterich
(Continued)

FOREIGN PATENT DOCUMENTS

AU 2014100939 A4 9/2014
BR 10 2014 021953-6 A2 4/2015
(Continued)

OTHER PUBLICATIONS

Non-certified English machine translation of CN204139562, origin of machine translation is Espacenet.com powered by the European Patent Office and Google, 6 pages, it cannot be guaranteed that this machine translation is intelligible, accurate, complete, reliable or fit for specific purposes, critical decisions should not be based on machine translation output.
(Continued)

*Primary Examiner* — Philip S Hyder
(74) *Attorney, Agent, or Firm* — Klintworth & Rozenblat IP LLP

(57) CLAIM

The ornamental design for a tile lippage [threaded] post, as shown and described.

DESCRIPTION

[FIG. 1 is a bottom perspective view of a tile lippage threaded post incorporating my new design;]
[FIG. 2 is a top perspective view thereof;]
[FIG. 3 is a bottom plan view thereof;]
[FIG. 4 is a top plan view thereof;]
[FIG. 5 is a left side elevation view thereof;]
[FIG. 6 is a right side elevation view thereof;]
[FIG. 7 is a front elevation view thereof; and,]
[FIG. 8 is a rear elevation view thereof.]
*The sole FIGURE is a top perspective view of a tile lippage post.*
The broken lines and unshaded regions in the [drawings illustrate] drawing illustrates portions of the tile lippage [threaded] post that form no part of the claimed design.

1 Claim, 5 Drawing Sheets

Figure 1:
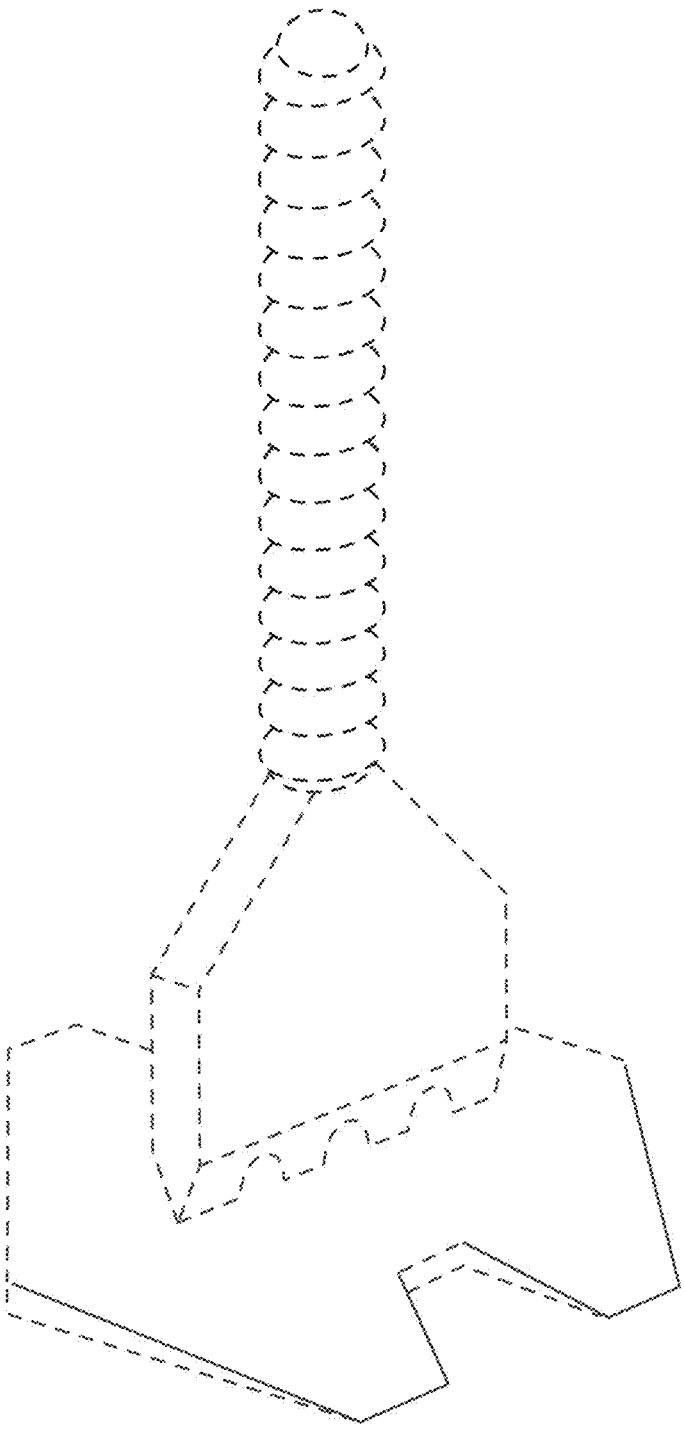
Figure 2:
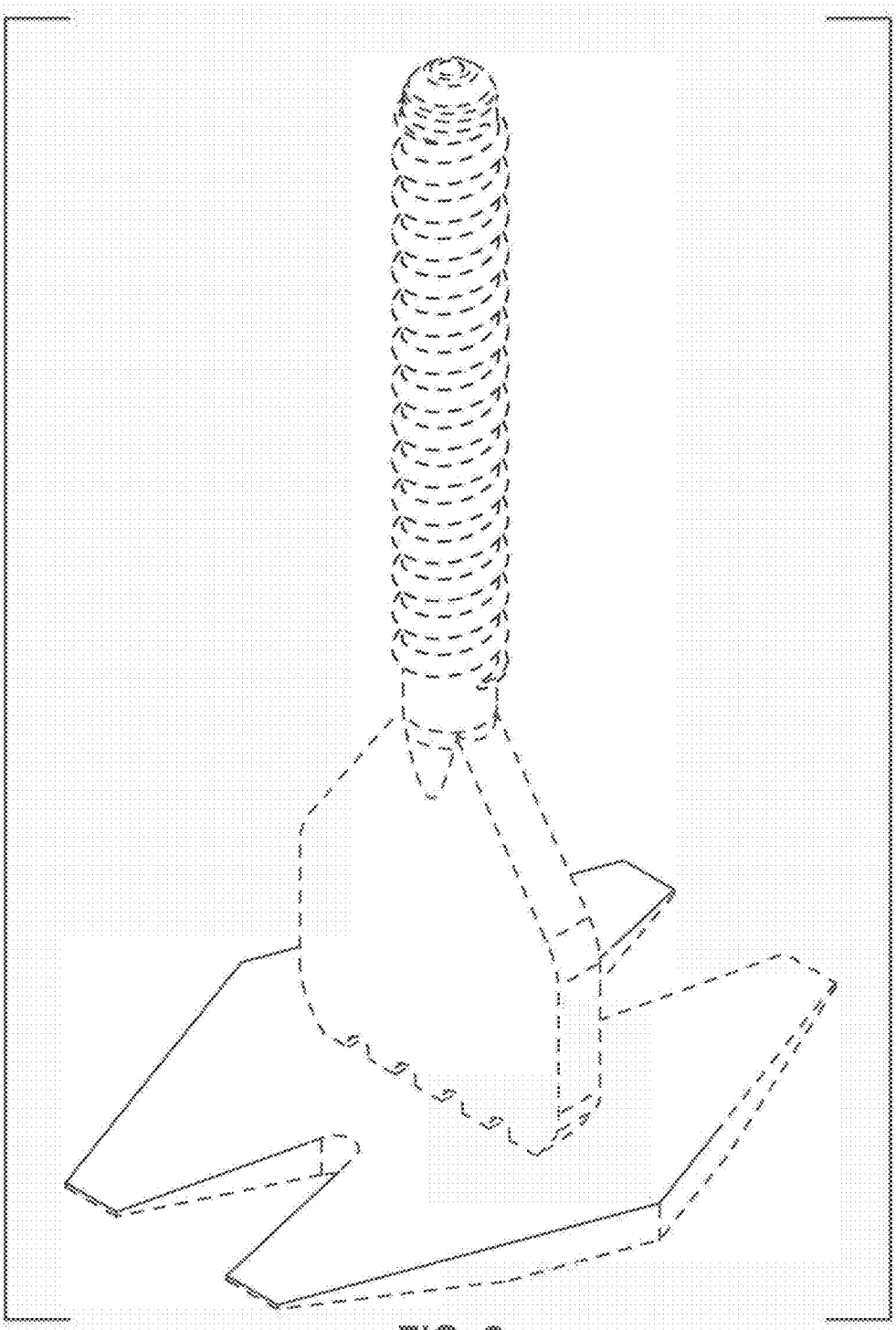
Figure 3:
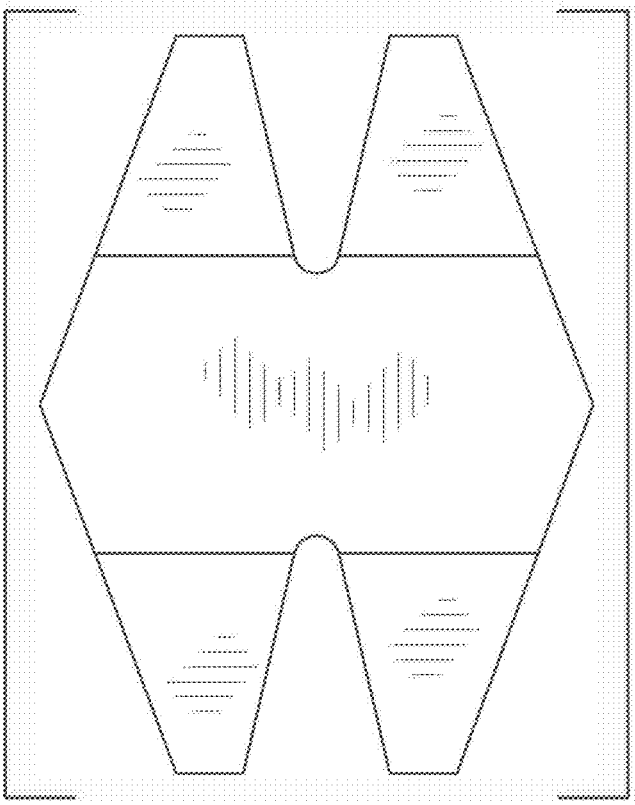
Figure 4:
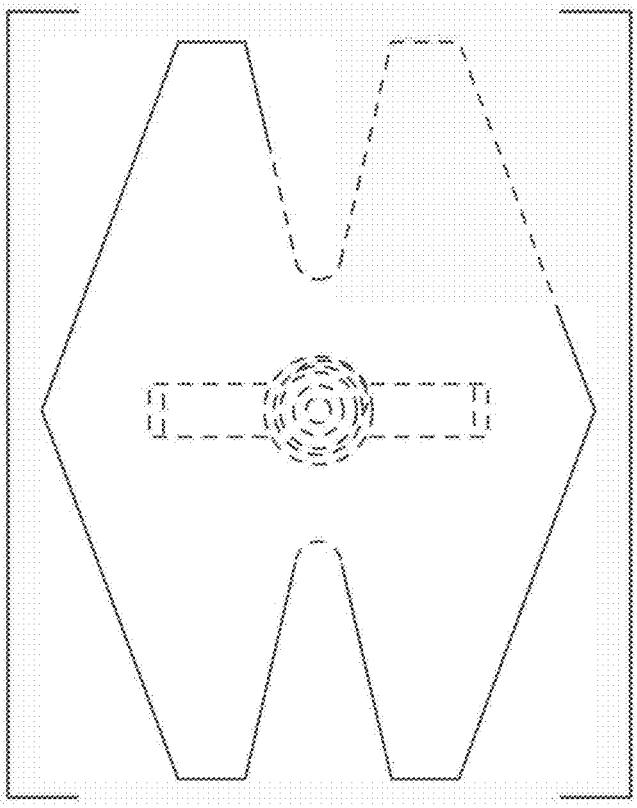
Figure 5:
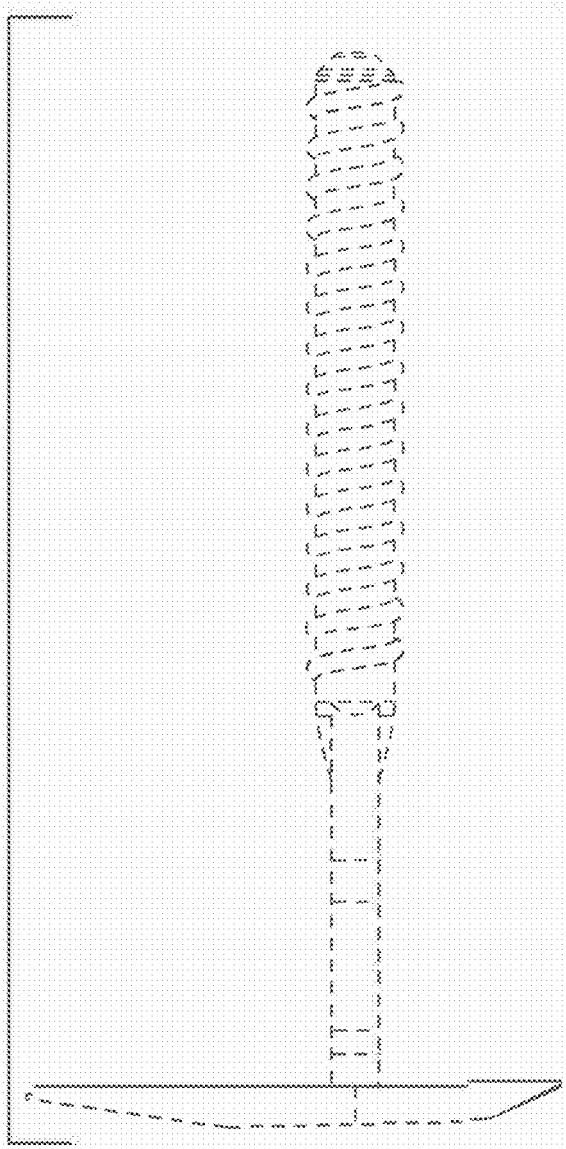
Figure 6:
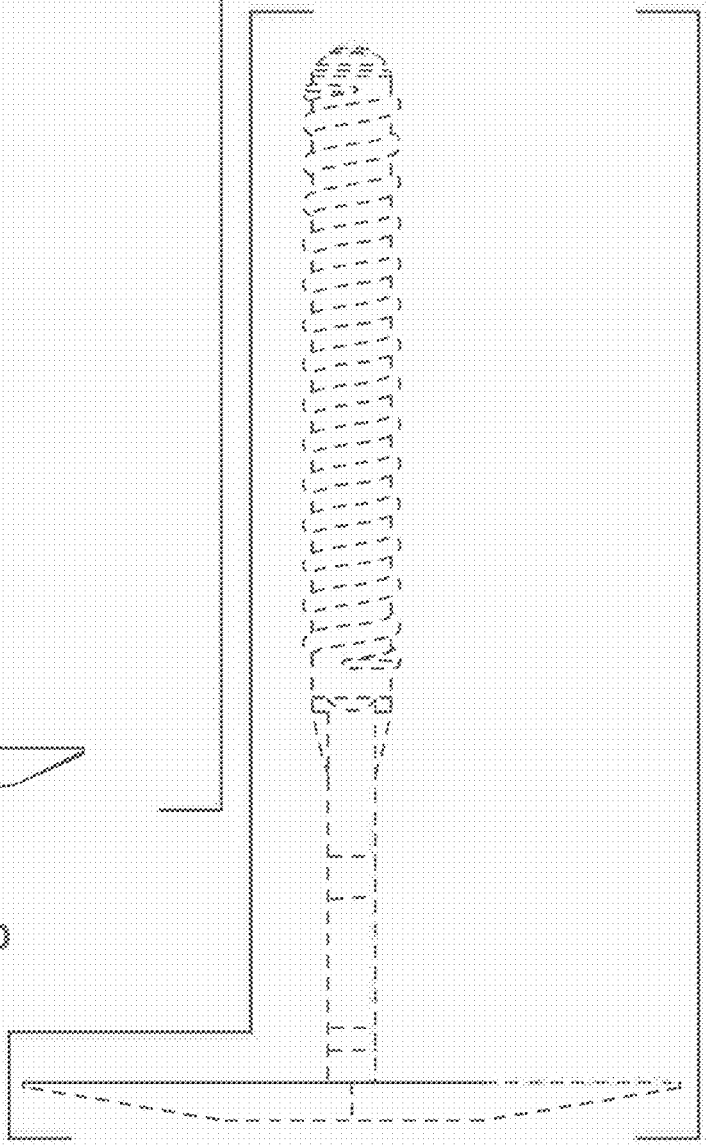
Figure 7:
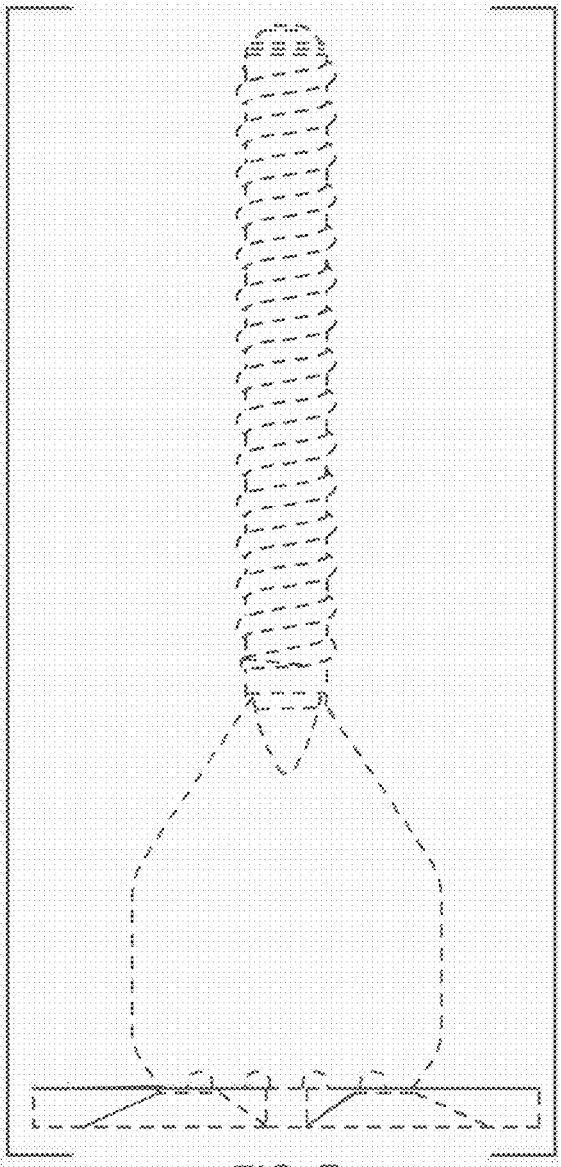
Figure 8:
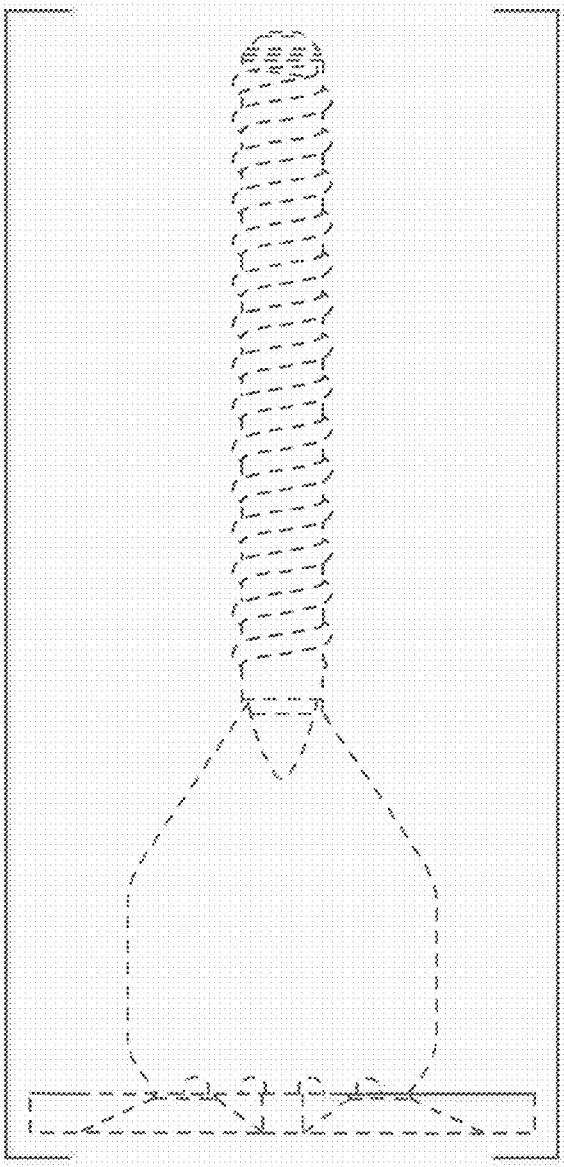

Matter enclosed in heavy brackets [ ] appears in the original patent but forms no part of this reissue; matter printed in italics indicates the additions made by reissue.

AMENDED

Related U.S. Application Data continuation-in-part of application No. 29/552,045, filed on Jan. 20, 2016, now Pat. No. Des. 778,709, which is a continuation-in-part of application No. 14/823,085, filed on Aug. 11, 2015, now Pat. No. 9,279,259, which is a continuation-in-part of application No. 14/718,131, filed on May 21, 2015, now Pat. No. 9,322,185.

(58) Field of Classification Search
CPC ..... E04F 13/0892; E04F 15/02022; E04F 21/1877; E04F 21/20; E04F 21/22; E04F 21/0092
See application file for complete search history.

(56) References Cited

U.S. PATENT DOCUMENTS 1,789,576 A 1/1931 Bowman
2,128,844 A 8/1938 Myer
D142,719 S 10/1945 Kissling
2,769,212 A 11/1956 Hammitt et al.
3,552,257 A 1/1971 Tanabe
3,961,453 A 6/1976 Couwenbergs
4,024,683 A 5/1977 Kilian
D269,852 S 7/1983 Frieberg
4,397,125 A 8/1983 Gussler, Jr.
D276,310 S 11/1984 Frieberg
4,546,580 A 10/1985 Ueno
4,688,363 A 8/1987 Sweeney et al.
4,955,142 A 9/1990 Rieck
5,020,953 A 6/1991 Wada
D327,111 S 6/1992 Hemming
D332,390 S 1/1993 Adams
D334,133 S 3/1993 Harzheim
D335,441 S 5/1993 Fraker
5,211,372 A 5/1993 Smith, Jr.
5,269,114 A 12/1993 Albers
5,288,534 A 2/1994 Tavshanjian
5,359,783 A 11/1994 Smith
5,542,219 A 8/1996 Dias
5,666,769 A 9/1997 Lundquist
5,827,028 A 10/1998 Swick
D408,268 S 4/1999 Dunn
5,953,878 A 9/1999 Johnson
6,047,520 A 4/2000 Caraballo
6,056,519 A 5/2000 Morita
6,164,618 A 12/2000 Yonemura
D460,571 S 7/2002 Schimmelpfennig
6,612,082 B2 9/2003 Schimmelpfennig
D491,443 S 6/2004 Lowery
D528,407 S 9/2006 Schwab
7,257,926 B1 8/2007 Kirby
D554,491 S 11/2007 Stenberg
7,367,786 B2 5/2008 Kang
7,472,522 B2 1/2009 Yang
D589,327 S 3/2009 Carnevali
D590,696 S 4/2009 Carnevali
7,603,825 B2 10/2009 Dohren
7,621,100 B2 11/2009 Kufner
7,650,700 B1 1/2010 Blankenship
D609,552 S 2/2010 Anderson
7,818,923 B2 10/2010 Alvarez
D630,077 S * 1/2011 Kufner ..... D8/105
D630,078 S * 1/2011 Kufner ..... E04F 21/1822 D8/105
7,861,487 B2 1/2011 Kufner
7,874,113 B2 1/2011 Eberle, III
7,946,093 B1 5/2011 Sturino
D640,119 S * 6/2011 Kufner ..... E04F 21/1822 D8/105
7,954,300 B1 * 6/2011 Kufner ..... E04F 21/22 33/526
7,992,354 B2 8/2011 Dada, Jr.
D645,337 S 9/2011 Hsu
8,079,199 B1 * 12/2011 Kufner ..... E04F 13/0892 33/526
D654,348 S 2/2012 Musselman
D658,963 S * 5/2012 Kufner ..... D8/105
8,181,420 B2 5/2012 Torrents I Comas
D664,170 S 7/2012 Chung
8,336,279 B2 12/2012 Kufner
D678,039 S 3/2013 Psaila
8,429,878 B1 * 4/2013 Hoffman ..... E04F 13/0889 52/747.11
8,429,879 B1 4/2013 Hoffman et al.
D692,747 S 11/2013 Schwab
8,578,674 B2 11/2013 Ross
8,607,530 B2 12/2013 Hoffman et al.
8,612,082 B2 12/2013 Hashimoto et al.
8,628,049 B2 1/2014 Ghatikar
8,635,815 B2 1/2014 Bordin
8,671,628 B2 3/2014 Sighinolfi
D703,034 S 4/2014 Stewart
8,689,522 B2 4/2014 Hoffman
8,800,246 B2 8/2014 Gorton
8,813,431 B2 8/2014 Smaidris
8,820,031 B2 * 9/2014 Kufner ..... E04F 21/22 52/749.11
8,845,202 B2 9/2014 Teimel
8,887,475 B2 * 11/2014 Ghelfi ..... E04F 21/0092 52/749.11
8,950,079 B2 2/2015 Hillebrandt
8,960,655 B2 2/2015 Wood
8,961,453 B2 2/2015 Bowman et al.
D734,119 S * 7/2015 Kufner ..... D8/105
D735,557 S 8/2015 Leshem
9,097,026 B2 8/2015 Hoffman et al.
9,127,466 B2 9/2015 Hinkle
D742,719 S 11/2015 Komura
9,228,363 B2 1/2016 Kufner
D748,973 S 2/2016 Rodenhouse
D749,941 S 2/2016 Rodenhouse et al.
9,279,259 B1 3/2016 Russo
9,322,185 B1 4/2016 Russo
9,322,186 B1 4/2016 Chang et al.
9,328,522 B2 5/2016 Bordin
D760,566 S * 7/2016 Biec ..... D8/47
D762,458 S 8/2016 Horne
9,470,002 B2 10/2016 Irvine
D775,935 S 1/2017 Sarajian
D776,519 S 1/2017 Almaghlouth
D778,709 S 2/2017 Russo
D783,393 S 4/2017 Weifenbach
9,657,485 B2 * 5/2017 Meyers ..... E04F 21/1877
D795,685 S 8/2017 Rodenhouse et al.
9,874,032 B1 * 1/2018 Chen ..... E04F 21/20
D812,109 S 3/2018 Cross et al.
D817,753 S 5/2018 Pedley et al.
D820,059 S * 6/2018 Biec ..... D8/47
D821,838 S * 7/2018 Castellanos ..... D8/47
10,053,872 B2 * 8/2018 Sighinolfi ..... E04F 21/0092
D834,922 S 12/2018 Russo
D837,016 S 1/2019 Psaila
2002/0089106 A1 7/2002 Horng
2006/0185269 A1 8/2006 Kufner et al.
2009/0126213 A1 5/2009 Tavy
2009/0288357 A1 11/2009 Kubicek
2009/0313927 A1 12/2009 Myers, Jr.
2013/0067854 A1 3/2013 Bordin
2013/0247508 A1 * 9/2013 Hoffman ..... E04F 21/00 52/749.11
2014/0008557 A1 1/2014 Vandamme
2014/0325936 A1 11/2014 PSaila
2015/0184355 A1 7/2015 Wang
2015/0211243 A1 7/2015 Irvine
2015/0240504 A1 * 8/2015 Hoffman ..... E04F 21/20 29/244
2015/0267420 A1 9/2015 Fontana
2015/0354231 A1 12/2015 Bordin
2016/0102724 A1 4/2016 Potter
2016/0369518 A1 12/2016 Sarajian et al.

(56) References Cited

U.S. PATENT DOCUMENTS

| | | | | |
|---|---|---|---|---|
| 2018/0100315 | A1* | 4/2018 | Volponi | E04F 15/02022 |
| 2018/0163415 | A1* | 6/2018 | Psaila | E04F 21/0092 |

FOREIGN PATENT DOCUMENTS

| | | | |
|---|---|---|---|
| BR | 1020140219536 | A2 | 4/2015 |
| CN | 203783094 | U | 8/2014 |
| CN | 204139562 | U | 2/2015 |
| EP | 2 241 702 | A2 | 10/2010 |
| EP | 2241702 | A2 | 10/2010 |
| EP | 2549030 | A2 | 1/2013 |
| EP | 2573296 | A1 | 3/2013 |
| EP | 2 549 030 | B1 | 12/2014 |
| EP | 2966238 | A1 | 1/2016 |
| EP | 2966239 | A1 | 1/2016 |
| ES | 2530622 | T3 | 11/2014 |
| ES | 1 138 645 | | 4/2015 |
| ES | 1138645 | U | 4/2015 |
| FR | 2678663 | A1 | 1/1993 |
| JP | 2013-204318 | A | 10/2013 |
| JP | 2013204318 | A | 10/2013 |
| WO | 2009/022359 | A1 | 2/2009 |
| WO | 2009022359 | A1 | 2/2009 |
| WO | WO2009022359 | A1 | 2/2009 |
| WO | 2013/023236 | A1 | 2/2013 |
| WO | 2013023236 | A1 | 2/2013 |
| WO | 2014/022889 | A1 | 2/2014 |
| WO | 2014022889 | A1 | 2/2014 |

OTHER PUBLICATIONS

Non-certified English machine translation of JP2013-204318, origin of machine translation is Espacenet.com powered by the European Patent Office and Google, 17 pages, it cannot be guaranteed that this machine translation is intelligible, accurate, complete, reliable or fit for specific purposes, critical decisions should not be based on machine translation output.

Proleveling Universal Rotating Pommel Cap 50, <http://www.flooringsupplyshop.com/tools-109/proleveling-leveling-system-609/proleveling-universal-rotating-pommel-cap-50-618.html> downloaded Jun. 3, 2015 (3 pages).

Tuscan SeamClip Leveling System, www.tuscanleveling.com/Products/Seamclip/seamclip.html,downloaded Jun. 3, 2015, (3) pages.

www.flooringsupplyshop.com/tool-109/proleveling-system-609/proleveling-universal-rotating-pommel-50-618.html, downloaded, Jun. 3, 2015 (3) pages.

Complaint, *Russo Trading Company, Inc.* v. *Donnelly Distribution LLC*, Case No. 18-CV-1851, Document 1, 2018, 13 pages.

Civil Coversheet, *Russo Trading Company, Inc.* v. *Donnelly Distribution LLC*, Document 1-1, 2018, 3 pages.

Exhibit A, Case 2:18-cv-01851, U.S. Pat. No. 9,279,259 B1, Document 1-2, 2018, 15 pages.

Exhibit B, Case 2:18-cv-01851, Donnelly Distribution R.L.S. Vite Brochure, Document 1-3, 2018, 3 pages.

Exhibit C, Case 2:18-cv-01851, U.S. Pat. No. 9,279,259—Infringement Analysis of the R.L.S. Vite tile-lippage system, Document 1-4, 2018, 6 pages.

Summons in a Civil Action to Donnelly Distribution LLC, *Russo Trading Company, Inc.* v. *Donnelly Distribution LLC*, Case 2:18-cv-01851, Document 1-5, 2018, 2 pages.

Appearance of Counsel for Russo Trading Company, Inc.—Adelson, *Russo Trading Company, Inc.* v. *Donnelly Distribution LLC* Case 2:18-cv-01851-JPS, Document 3, 2018, 1 page.

Appearance of Counsel for Russo Trading Company, Inc.—Ferguson, *Russo Trading Company, Inc.* v. *Donnelly Distribution LLC* Case 2:18-cv-01851-JPS, Document 4, 2018, 1 page.

Summons in a Civil Action to Donnelly Distribution LLC, *Russo Trading Company, Inc.* v. *Donnelly Distribution LLC*, Case 2:18-cv-01851-JPS, Document 1-5, 2018, 2 pages.

Report on the Filing or Determination of an Action Regarding a Patent or Trademark, U.S. Pat. No. 9,279,259, Case 2:18-cv-01851-JPS, Document 5, 2018, 1 page.

Consent to Proceed Before A Magistrate Judge, *Russo Trading Company, Inc.* v. *Donnelly Distribution LLC*, Case 2:18-cv-01851-JPS, Document 6, 2018, 2 pages.

Affidavit of Service for Hansen Reynolds LLC, *Russo Trading Company, Inc.* v. *Donnelly Distribution LLC*, Case 2:18-cv-01851-JPS, Document 7, 2018, 2 pages.

Appearance of Counsel for Donnelly Distribution LLC—Foley, *Russo Trading Company, Inc.* v. *Donnelly Distribution LLC*, Case 2:18-cv-01851-JPS, Document 8, 2018, 1 page.

Appearance of Counsel for Donnelly Distribution LLC—Thome, *Russo Trading Company, Inc.* v. *Donnelly Distribution LLC*, Case 2:18-cv-01851-JPS, Document 9, 2018, 1 page.

Appearance of Counsel for Donnelly Distribution LLC—Waterstreet, *Russo Trading Company, Inc.* v. *Donnelly Distribution LLC*, Case2:18-cv-01851-JPS, Document 10, 2018, 1 page.

Defendant Donnelly Distribution LLC'S Corporate Disclosure Statement, *Russo Trading Company, Inc.* v. *Donnelly Distribution LLC*, Case 2:18-cv-01851-JPS, Document 11, 2018, 2 pages.

Joint Stipulation to Extend Time for Defendant Donnelly Distribution LLC to Respond to Plaintiffs Complaint, *Russo Trading Company, Inc.* v. *Donnelly Distribution LLC*, Case 2:18-cv-01851-JPS, Document 12, 2018, 2 pages.

Rule 16 Scheduling Conference, *Russo Trading Company, Inc.* v. *Donnelly Distribution LLC*, Case 2:18-cv-01851-JPS, Document 13, 2018, 1 page.

Consent to Proceed, *Russo Trading Company, Inc.* v. *Donnelly Distribution LLC*, Case 2:18-cv-01851-JPS, Document 14, 2018, 2 pages.

Joint Rule 26(f) Plan, *Russo Trading Company, Inc.* v. *Donnelly Distribution LLC*, Case 2:18-cv-01851-JPS, Document 15, 2019, 9 pages.

Answer, Affirmative Defenses and Counterclaim of Defendant Donnelly Distribution LLC, *Russo Trading Company, Inc.* v. *Donnelly Distribution LLC*, Case 2:18-cv-01851-JPS, Document 16, 2019, 24 pages.

Court Minutes of Conference, Hon J.P. Stadtmueller Presiding, *Russo Trading Company, Inc.* v. *Donnelly Distribution LLC*, Case2:18-cv-01851-JPS, Document 17, 2019, 1 page.

[Proposed] Stipulated Protective Order, *Russo Trading Company, Inc.* v. *Donnelly Distribution LLC*, Case 2:18-cv-01851-JPS, Document 18, 2019, 25 pages.

Trial Scheduling Order, *Russo Trading Company, Inc.* v. *Donnelly Distribution LLC*, Case 2:18-cv-01851-JPS, Document 19, 2019, 8 pages.

Answer to Counterclaim of Defendant Donnelly Distribution LLC, *Russo Trading Company, Inc.* v. *Donnelly Distribution LLC*, Case 2:18-cv-01851-JPS, Document 20, 2019, 4 pages.

Order, *Russo Trading Company, Inc.* v. *Donnelly Distribution LLC*, Case 2:18-cv-01851-JPS, Document 21, 2019, 27 pages.

Exhibit A to Stipulated Protective Order, *Russo Trading Company, Inc.* v. *Donnelly Distribution LLC*, Case 2:18-cv-01851-JPS, Document 21-1, 2019, 2 pages.

Defendent Donnelly Distribution LLC's and Russo Trading Company, Inc.'s Joint Civil I. R. 7(h) Expedited Non-Dispositive Motion for Stay of Proceedings, *Russo Trading Company, Inc.* v. *Donnelly Distribution LLC*, Case 2:18-cv-01851-JPS, Document 22, 2019, 5 pages.

Declaration of Mark F. Foley in Support of Joint Motion for Stay of Proceedings, *Russo Trading Company, Inc.* v. *Donnelly Distribution LLC*, Case 2:18-cv-01851-JPS, Document 23, 2019, 2 pages.

Petition for Inter Partes Review of U.S. Pat. No. 9,279,259, *Russo Trading Company, Inc.* v. *Donnelly Distribution LLC*, Case 2:18-cv-01851-JPS, Document 23-1A, 2019, 2 pages.

Email: RE Russo v Donnely Requested Change in Schedule for Expert Witnesses, *Russo Trading Company, Inc.* v. *Donnelly Distribution LLC*, Case 2:18-cv-01851-JPS, Document 23-2B 2019, 82 pages.

(56) References Cited

OTHER PUBLICATIONS

*Acantha LLC* v. *Depuy Synthes Sales Inc.*, Not Reported in Fed. Supp. (2016), *Russo Trading Company, Inc.* v. *Donnelly Distribution LLC*, Case 2:18-cv-01851-JPS, Document 23-3C, 2019, 2 pages.
*Ultratec, Inc. v. CaptionCall, LLC*, 611 Fed.Appx. 720 (2015), *Russo Trading Company, Inc.* v. *Donnelly Distribution LLC*, Case 2:18-cv-01851-JPS, Document 23-4D, 2019, 3 pages.
*E-imagedata Corp* v. *Digital Check Corp*, Not Reported in Fed. Supp. (2017), *Russo Trading Company, Inc.* v. *Donnelly Distribution LLC*, Case 2:18-cv-01851-JPS, Document 23-5E, 2019, 4 pages.
Email: IPR2019-00761: Filing Date Accorded Notice—*Donnelly Distribution LLC* v. *Owner of 9279259, Russo Trading Company, Inc.* v. *Donnelly Distribution LLC*, Case 2:18-cv-01851-JPS, Document 23-6F, 2019, 1 page.
Order, *Russo Trading Company, Inc.* v. *Donnelly Distribution LLC*, Case 2:18-cv-01851-JPS, Document 24, 2019, 5 pages.
Notice of Institution Decision in Inter Partes Review of the '259 Patent and Request for Status Conference, *Russo Trading Company, Inc.* v. *Donnelly Distribution LLC*, Case 2:18-cv-01851-JPS, Document 25, 2019, 3 pages.
Declaration of Jeremy-Adelson, *Russo Trading Company, Inc.* v. *Donnelly Distribution LLC*, Case 2:18-cv-01851-JPS, Document 26, 2019, 2 pages.
Exhibit A, *Russo Trading Company, Inc.* v. *Donnelly Distribution LLC*, Case 2:18-cv-01851-JPS, Document 26-1, 2019, 33 pages.
Exhibit B, *Russo Trading Company, Inc.* v. *Donnelly Distribution LLC*, Case 2:18-cv-01851-JPS, Document 26-2, 2019, 4 pages.
Declaration of Mark F. Foley, *Russo Trading Company, Inc.* v. *Donnelly Distribution LLC*, Case 2:18-cv-01851-JPS, Document 28, 2019, 2 pages.
Exhibit A, *Russo Trading Company, Inc.* v. *Donnelly Distribution LLC*, Case 2:18-cv-01851-JPS, Document 28-1, 2019, 11 pages.
Exhibit B, *Russo Trading Company, Inc.* v. *Donnelly Distribution LLC*, Case 2:18-cv-01851-JPS, Document 28-2, 2019, 18 pages.
Defendant's Notice of Institution Decision in Inter Partes Review of the '259 Patent, Request for Continuation of Stay, and Opposition to Plaintiffs Request to Lift Stay and for a Status Conference, *Russo Trading Company, Inc.* v. *Donnelly Distribution LLC*, Case 2:18-cv-01851-JPS, Document 27, 2019, 6 pages.
Order, *Russo Trading Company, Inc.* v. *Donnelly Distribution LLC*, Case 2:18-cv-01851-JPS, Document 29, 2019, 3 pages.
Notice of Decision Terminating Inter Partes Review of U.S. Pat. No. 9,279,259 and Motion to Lift Stay and for Leave to Amend Complaint, *Russo Trading Company, Inc.* v. *Donnelly Distribution LLC*, Case 2:18-cv-01851-JPS, Document 30, 2019, 6 pages.
Exhibit 1, *Russo Trading Company, Inc.* v. *Donnelly Distribution LLC*, Case 2:18-cv-01851-JPS, Document 30-1, 2019, 43 pages.
Declaration of Jeremy Adelson, *Russo Trading Company, Inc.* v. *Donnelly Distribution LLC*, Case 2:18-cv-01851-JPS, Document 31, 2019, 2 pages.
Exhibit A, *Russo Trading Company, Inc.* v. *Donnelly Distribution LLC*, Case 2:18-cv-01851-JPS, Document 31-1, 2019, 4 pages.
Defendant's Response in Opposition to Plaintiffs Motion to Lift Stay and for Leave to Amend Complaint, *Russo Trading Company, Inc.* v. *Donnelly Distribution LLC*, Case 2:18-cv-01851-JPS, Document 34, 2020, 19 pages.
Declaration of Roger L. Browdy in Support of Defendant's Response in Opposition to Plaintiff's Motion to Lift Stay and for Leave to Amend Complaint, *Russo Trading Company, Inc.* v. *Donnelly Distribution LLC*, Case 2:18-cv-01851-JPS, Document 35, 2020, 4 pages.
Exhibit A, *Russo Trading Company, Inc.* v. *Donnelly Distribution LLC*, Case 2:18-cv-01851-JPS, Document 35-1, 2020, 16 pages.
Exhibit B, *Russo Trading Company, Inc.* v. *Donnelly Distribution LLC*, Case 2:18-cv-01851-JPS, Document 35-2, 2020, 17 pages.
Exhibit C, *Russo Trading Company, Inc.* v. *Donnelly Distribution LLC*, Case 2:18-cv-01851-JPS, Document 35-3, 2020, 26 pages.
Exhibit D, *Russo Trading Company, Inc.* v. *Donnelly Distribution LLC*, Case 2:18-cv-01851-JPS, Document 35-4, 2020, 5 pages.
Exhibit E, *Russo Trading Company, Inc.* v. *Donnelly Distribution LLC*, Case 2:18-cv-01851-JPS, Document 35-5, 2020, 2 pages.
Reply Brief in Support of Plaintiff Russo Trading Company, Inc.'s Motion to Lift Stay and for Leave to Amend Complaint, Case 2:18-cv-01851-JPS, Document 36, 2020, 20 pages.
English machine translation of CN 203783094U.
Tile Cap, Alpha Professional Tools, 5 pages, published at least as early as May 20, 2015.
Bruno Plast Tile-Laying System, www.brunoplast.de/gambio/index.php, downloaded Jun. 3, 2015, (2) pages.
Proleveling Universal Rotating Pommel Cap 50, www.flooringsupplyshop.com/tool-109/proleveling-system-609/proleveling-universal-rotating-pommel-50-618.html, downloaded, Jun. 3, 2015 (3) pages.
Tuscan SeamClip Leveling System, www.tuscanleveling.com/Products/Seamclip/seamclip.html, downloaed Jun. 3, 2015, (3) pages.
RTC Tornado Leveling System, www.rtcproducts.com/us/tornado-tile-leveling-system/, downloaded Jun. 3, 2015 , (4) pages.
Raimondi RLS Title Leveling Spacers System, www.flooringsupplyshop.com/blog/cool-tools/raimondi-rts-tile-leveling-spacers-system#, download Jun. 3, 2015, (11) pages.
Non-certified English machine translation of BR 10 2014 021 953-6, origin of machine translation unknown, 4 pages, it cannot be guaranteed that this machine translation is intelligible, accurate, complete, reliable or fit for specific purposes, critical decisions should not be based on machine-translation output.
Non-certified English machine translation of ES 1 138 645, origin of machine translation is Espacenet.com powered by the European Patent Office and Google, 6 pages, it cannot be guaranteed that this machine translation is intelligible, accurate, complete, reliable or fit for specific purposes, critical decisions should not be based on machine-translation output.
Non-certified English machine translation of CN204139562, origin of machine translation is Espacenet.com powered by the European Patent Office and Google, 6 pages, it cannot be guaranteed that this machine translation is intelligible, accurate, complete, reliable or fit for specific purpopses, critical decisions should not be based on machine-translation output.
Non-certified English machine translation of JP2013-204318, origin of machine translation is Espacenet.com powered by the European Patent Office and Google, 17 pages, it cannot be guaranteed that this machine translation is intelligible, accurate, complete, reliable or fit for specific purposes, critical decision should not be based on machine-translation output.
Alleged, but unverified, English translation of BR 10 2014 021 953-6, allegedly certified by Performance Language Solutions, dated Jan. 15, 2019, 24 pages, it cannot be guaranteed that this alleged certified translation is intelligible, accurate, complete, reliable or fit for specific purposes, critical decisions should not be based on this alleged certified translation.
Alleged, but unverified, English translation of ES 1 138 645, allegedly certified by Performance Language Solutions, dated Jan. 15, 2019, 24 pages, it cannot be guaranteed that this alleged certified translation is intelligible, accurate complete, reliable or fit for specific purposes, critical decisions should not be based on this alleged certified translation.
Alleged, but unverified, English translation of CN204139562, allegedly certified by Performance Language Solutions, dated Jan. 14, 2019, 24 pages, it cannot be guaranteed that this alleged certified translation is intelligible, accurate complete, reliable or fit for specific purposes, critical decisions should not be based on this alleged certified translation.
Alleged, but unverified, English translation of JP2013-204318, allegedly certified by Performance Language Solutions, dated Jan. 15, 2019, 24 pages, it cannot be guaranteed that this alleged certified translation is intelligible, accurate complete, reliable or fit for specific purposes, critical decisions should not be based on this alleged certified translation.

* cited by examiner

AMENDED

CANCELLED

CANCELLED

CANCELLED

CANCELLED

CANCELLED

CANCELLED

CANCELLED